US009565668B2

United States Patent
Yi et al.

(10) Patent No.: US 9,565,668 B2
(45) Date of Patent: Feb. 7, 2017

(54) METHOD AND APPARATUS FOR SUPPORTING A CARRIER AGGREGATION GROUP IN A WIRELESS COMMUNICATION SYSTEM

(71) Applicant: LG ELECTRONICS INC., Seoul (KR)

(72) Inventors: Yunjung Yi, Seoul (KR); Bonghoe Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/433,321

(22) PCT Filed: Oct. 2, 2013

(86) PCT No.: PCT/KR2013/008843
§ 371 (c)(1),
(2) Date: Apr. 2, 2015

(87) PCT Pub. No.: WO2014/054892
PCT Pub. Date: Apr. 10, 2014

(65) Prior Publication Data
US 2015/0264666 A1    Sep. 17, 2015

Related U.S. Application Data

(60) Provisional application No. 61/709,137, filed on Oct. 2, 2012.

(51) Int. Cl.
*H04W 4/00* (2009.01)
*H04W 72/04* (2009.01)
(Continued)

(52) U.S. Cl.
CPC ............ *H04W 72/042* (2013.01); *H04L 5/001* (2013.01); *H04L 5/0094* (2013.01);
(Continued)

(58) Field of Classification Search
CPC .......... H04W 72/042; H04W 72/0453; H04W 74/002; H04W 76/046; H04L 5/001
See application file for complete search history.

(56) References Cited

U.S. PATENT DOCUMENTS

| 2011/0261776 A1 | 10/2011 | Ahn et al. |
| 2011/0292874 A1* | 12/2011 | Ho ..................... H04W 52/42 370/328 |

(Continued)

FOREIGN PATENT DOCUMENTS

| WO | WO 2011/145823 A2 | 11/2011 |
| WO | WO 2012/108718 A2 | 8/2012 |

OTHER PUBLICATIONS

3GPP, 3rd Generation Partnership Project; Technical Specification Group Radio Access Networks: Evolved Universal Terrestrial Radio Access (E-UTRA); Carrier Aggegation Enhancements; UE and BS radio transmission and reception (Release 11), 3GPP TR 36.823, V0.1.0. Aug. 2012, pp. 1-94.

(Continued)

*Primary Examiner* — Gregory Sefcheck
*Assistant Examiner* — Jael Ulysse
(74) *Attorney, Agent, or Firm* — Birch, Stewart, Kolasch & Birch, LLP

(57) ABSTRACT

A method for and apparatus for supporting a carrier aggregation group in a wireless communication system supporting multiple carriers is provided. A wireless device receives a RRC configuration signal including one or more serving cells from a macro cell and a RRC configuration signal including one or more serving cells from a small cell, and configures at least two carrier aggregation group (CAG)s based on the RRC configuration signal each. And, this invention includes that cell planning for multi-CCs is provided more accurately and efficiently.

9 Claims, 6 Drawing Sheets

(51) Int. Cl.
H04L 5/00 (2006.01)
H04W 74/00 (2009.01)
H04W 76/04 (2009.01)

(52) U.S. Cl.
CPC ..... *H04W 72/0453* (2013.01); *H04W 74/002* (2013.01); *H04W 76/046* (2013.01); *H04L 5/0023* (2013.01); *H04L 5/0032* (2013.01)

(56) References Cited

U.S. PATENT DOCUMENTS

| | | | |
|---|---|---|---|
| 2012/0039302 A1 | 2/2012 | Chun et al. | |
| 2012/0051306 A1 | 3/2012 | Chung et al. | |
| 2012/0087257 A1* | 4/2012 | Larsson | H04L 5/001 370/252 |
| 2012/0140689 A1* | 6/2012 | Pelletier | H04W 76/048 370/311 |
| 2012/0147844 A1* | 6/2012 | Kim | H04L 5/001 370/330 |
| 2012/0207130 A1* | 8/2012 | Jang | H04W 8/24 370/331 |
| 2012/0214540 A1* | 8/2012 | Narasimha | H04W 36/30 455/525 |
| 2012/0257510 A1* | 10/2012 | Jeong | H04L 5/0098 370/242 |
| 2012/0257513 A1* | 10/2012 | Yamada | H04L 1/0618 370/248 |
| 2012/0275398 A1* | 11/2012 | Chen | H04W 24/10 370/329 |
| 2012/0282964 A1* | 11/2012 | Xiao | H04B 7/024 455/515 |
| 2012/0287865 A1* | 11/2012 | Wu | H04W 74/006 370/329 |
| 2013/0003668 A1* | 1/2013 | Xiao | H04L 5/001 370/329 |
| 2013/0003672 A1* | 1/2013 | Dinan | H04L 1/00 370/329 |
| 2013/0010641 A1* | 1/2013 | Dinan | H04W 36/0072 370/254 |
| 2013/0021996 A1* | 1/2013 | Wang | H04W 72/082 370/329 |
| 2013/0028069 A1* | 1/2013 | Pelletier | H04W 72/0453 370/216 |
| 2013/0028117 A1* | 1/2013 | Montojo | H04L 5/001 370/252 |
| 2013/0065585 A1* | 3/2013 | Pelletier | H04W 4/02 455/435.1 |
| 2013/0136006 A1 | 5/2013 | Kim et al. | |
| 2013/0176953 A1* | 7/2013 | Stern-Berkowitz | H04W 52/146 370/329 |
| 2013/0210422 A1* | 8/2013 | Pani | H04W 8/02 455/423 |
| 2013/0242880 A1* | 9/2013 | Miao | H04L 5/001 370/329 |
| 2013/0250881 A1* | 9/2013 | Liao | H04W 36/08 370/329 |
| 2013/0315114 A1 | 11/2013 | Seo et al. | |

OTHER PUBLICATIONS

LG Electronics "Aspect on Simultaneous Transmission of PRACH and UL Channels Considering Multiple Timing Advance," 3GPP TSG RAN WG1 Meeting #67, R1-113910, San Francisco, USA, Nov. 14-18, 2011 (EPO Sever date Nov. 9, 2011), 6 pages, XP-50562268A.

Shen et al., "Overview of 3GPP LTE-Advanced Carrier Aggregation for 4G Wireless Communications," IEEE Communications Magazine, vol. 50, No. 2, Feb. 2012, pp. 122-130, XP-11417048A.

* cited by examiner

METHOD AND APPARATUS FOR SUPPORTING A CARRIER AGGREGATION GROUP IN A WIRELESS COMMUNICATION SYSTEM

CROSS REFERENCE TO RELATED APPLICATIONS

This application is the National Phase of PCT International Application No. PCT/KR2013/008843, filed on Oct. 2, 2013, which claims priority under 35 U.S.C. 119(e) to U.S. Provisional Application No. 61/709,137, filed on Oct. 2, 2012, all of which are hereby expressly incorporated by reference into the present application.

TECHNICAL FIELD

The present invention relates to wireless communications, and more particularly, to a method and apparatus for supporting a carrier aggregation group in a wireless communication system supporting multiple carriers.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically noncontinuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. For example, exchanging ACK (Acknowledgement)/NACK (Non-Acknowledgement) information for performing HARQ (Hybrid Automatic Repeat reQuest), controlling power of the HARQ, and the like, are required. Also an efficient cell planning for multi-CCs is required.

DISCLOSURE OF INVENTION

Technical Problem

The present invention provides a method and apparatus for supporting a carrier aggregation group in a wireless communication system supporting multiple carriers.

The present invention also provides a method and apparatus for configuring a group of cells belonging to a same eNB in a wireless communication system supporting multiple carriers.

The present invention also provides a method and apparatus for configuring at least two carrier aggregation group for serving cells belonging to different eNBs in a wireless communication system supporting multiple carriers.

Solution to Problem

In an aspect, a method for supporting a carrier aggregation group in a wireless communication system supporting multiple carriers is provided. The method may include receiving a RRC configuration signal including one or more serving cells from a macro cell, receiving a RRC configuration signal including one or more serving cells from a small cell, and configuring at least two carrier aggregation group (CAG)s based on the RRC configuration signal each.

The method may further include the at least two CAGs comprise, wherein the each CAG of the at least two CAGs includes the one or more serving cells with different carriers, and a primary serving cell (PCell) for the each CAG is configured independently from each other.

The method may further include configuring that a PCell of the macro cell is aggregated as a master primary serving cell (M-PCell) which is a primary serving cell of a first CAG.

In another aspect, a wireless device for supporting a carrier aggregation group in a wireless communication system supporting multiple carriers is provided. The wireless device includes a radio frequency unit for receiving a radio signal, and a processor, operatively coupled with the radio frequency unit, configured to receive a RRC configuration signal including one or more serving cells from a macro cell and a RRC configuration signal including one or more serving cells from a small cell, and configure at least two carrier aggregation group (CAG)s based on the RRC configuration signal each.

The wireless device further includes that the processor is configured that a primary serving cell (PCell) for the each CAG is configured independently from each other and, a PCell of the macro cell is configured as a CAG primary serving cell.

Advantageous Effects of Invention

This invention provides that the at least two serving cells with different coverage for Carrier Aggregation Group (CAG) of eNB can be used for data transmission. More details, this invention can be included that multiple CAG where each CAG containing single CC or multiple CCs with different carriers, for example, a CAG including cells of a macro-eNB and a CAG including cells of a small-eNB are configured for UE. Therefore, this invention may keep the benefit of macro coverage in terms of hand-over & coverage, boost data throughput by localizing data transmission, and offload heavy load from the macro-cell. So it can offer better Quality of Experience (QoE) on UEs in particular cell-edge UEs. Also a more efficient cell planning for multi-CCs is provided in this invention.

MODE FOR THE INVENTION

Figure 1:
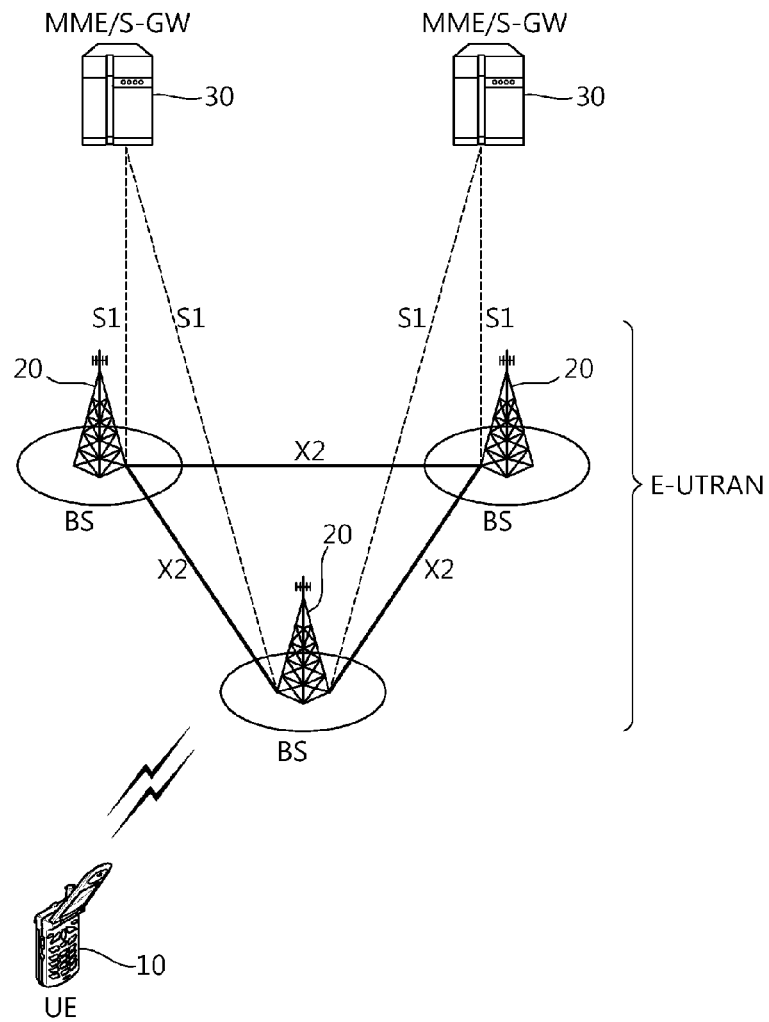
FIG. 1 is view illustrating a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
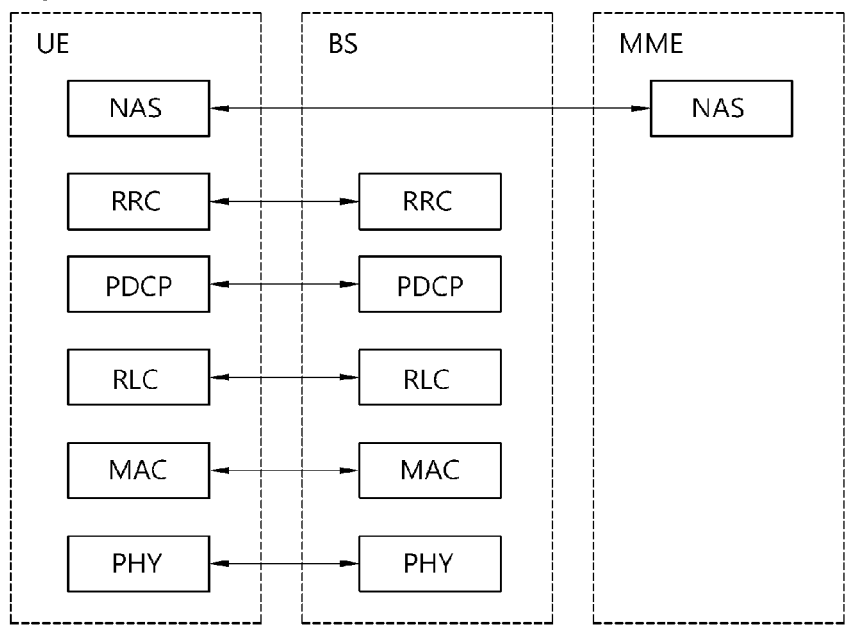
FIG. 2 is a view illustrating an example of a protocol structure to which the present invention is applied.

FIG. 2 is a diagram showing a radio protocol architecture for a user plane (U-plane) and a control plane (C-plane). The user plane is a protocol stack for user data transmission. The control plane is a protocol stack for control signal transmission with RRC and NAS layers.

Referring to FIG. 2, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH) or optionally added an Enhanced PDCCH (EPDDCH), i.e., an L1/L2 control channel.

Figure 3:
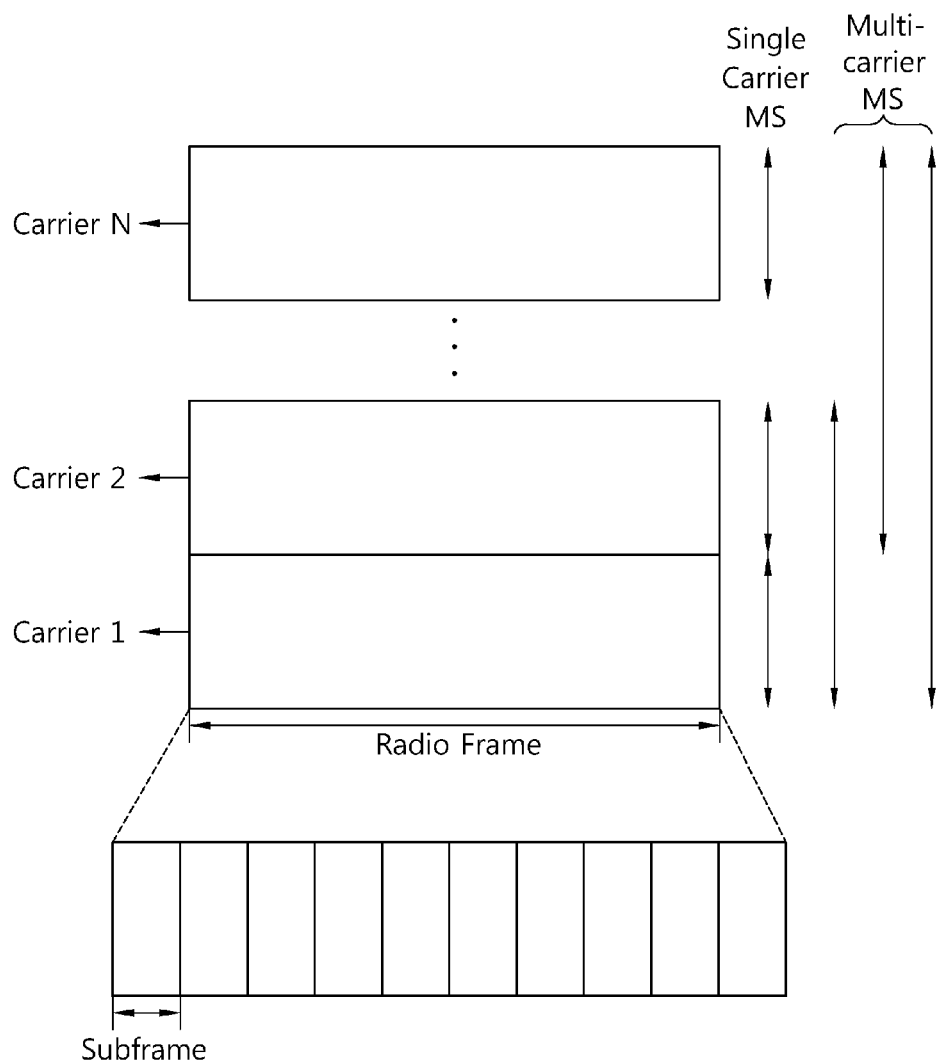
FIG. 3 is a view illustrating an example of a frame structure for a multi-carrier operation to which the present invention is applied.

FIG. 3 is a view illustrating an example of a frame structure for a multi-carrier operation to which the present invention is applied. This invention can be also applied that the aggregated CCs are not aligned at subframe as synchronization.

Referring to FIG. 3, a UE may support one or more carriers (Carrier 1 or more Carriers 2 . . . N) according to UE's capability thereof. Multiple carriers may be adjacent to each other or may not.

Component carriers may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC can be also activated or deactivated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated a primary component carrier and/or a secondary component carrier from the BS.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . , 7 for a serving cell index 1 corresponds to a $7^{th}$ bit from the left, which are the remaining indices other than 0, i.e., the index of the Pcell. Herein, the index of the serving cell may be a logical index determined relatively for each UE, or may be a physical index for indicating a cell of a specific frequency band.

Figure 4:
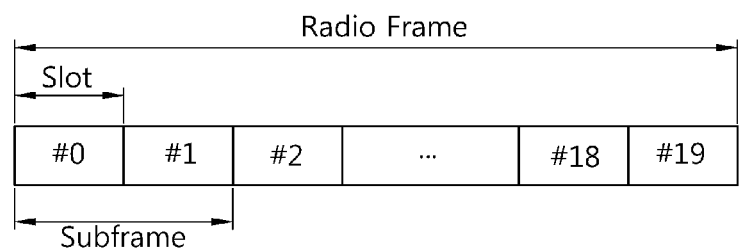
FIG. 4 shows the structure of a radio frame to which the present invention is applied.

FIG. 4 shows the structure of a radio frame to which the present invention is applied.

Referring to FIG. 4, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE and may be called an SC-FDMA symbol or a symbol period depending on a multi-access scheme. An RB is a resource allocation unit, and it includes a plurality of contiguous subcarriers in one slot.

The structure of the radio frame is only illustrative, and the number of subframes included in a radio frame or the number of slots included in a subframe and the number of OFDM symbols included in a slot may be changed in various ways.

In relation to resource allocation, a physical resource structure is first described.

Figure 5:
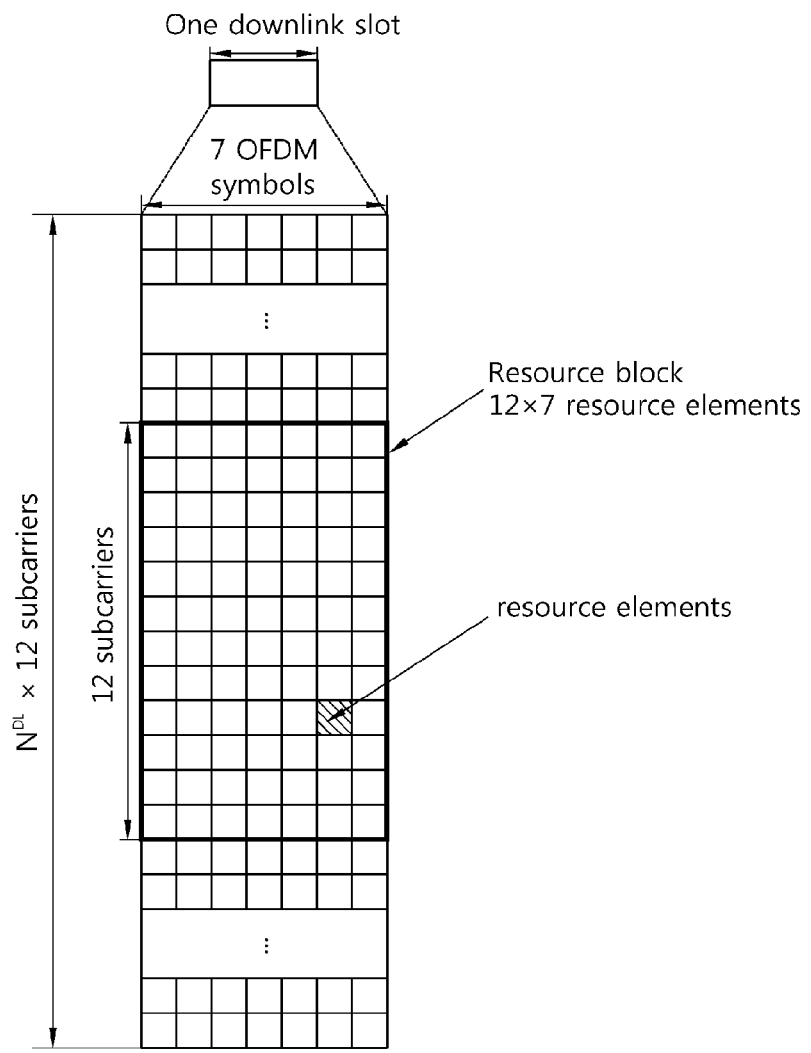
FIG. 5 is an exemplary diagram showing a resource grid for one downlink slot to which the present invention is applied.

FIG. 5 is an exemplary diagram showing a resource grid for one downlink slot to which the present invention is applied.

Referring to FIG. 5, the downlink slot includes a plurality of OFDM symbols in the time domain. Here, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
|---|---|---|---|
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 6:
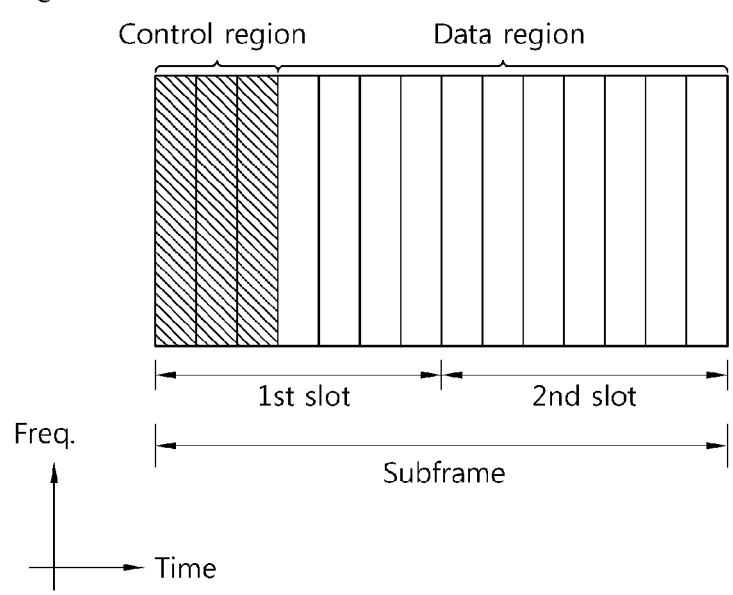
FIG. 6 shows the structure of a downlink subframe to which the present invention is applied.

FIG. 6 shows the structure of a downlink subframe to which the present invention is applied.

Referring to FIG. 6, a subframe includes two slots. The former 0 or 1 or 2 or 3 OFDM symbols of the first slot within the subframe correspond to a control region to which a PDCCH is allocated, and the remaining OFDM symbols thereof become a data region to which a PDSCH is allocated. When 0 OFDM symbols of the first slot within the subframe is used for control region, an enhanced PDCCH (EPDCCH) can be placed in data region which conveys control information.

Downlink control channels include a Physical Control Format Indicator Channel (PCFICH), a Physical Downlink Control Channel (PDCCH)/EPDCCH, and a Physical Hybrid-ARQ Indicator Channel (PHICH)/EPHICH.

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH/EPDCCH.

The PHICH/EPHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH/EPDCCH, that is, a downlink physical channel, is described below.

A PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCH/EPDCCHs may be transmitted within the control region, and a UE can monitor a plurality of PDCCH/EPDCCHs. PDCCH/EPDCCHs are transmitted on one Control Channel Element (CCE)/ECCE or on an aggregation of some contiguous CCE/ECCEs. A CCE (ECCE) is a logical assignment unit for providing a coding rate according to the state of a radio channel to a PDCCH/EPDCCH. A CCE/ECCE corresponds to a plurality of resource element groups (REGs). The format of a PDCCH/EPDCCH and the number of possible bits of a PDCCH/EPDCCH are determined by a correlation between the number of CCE(ECCE)s and a coding rate provided by CCE(ECCE)s.

Control information transmitted through a PDCCH/EPDCCH is called Downlink Control Information (hereinafter referred to as DCI). The DCI includes uplink or downlink scheduling information or includes an uplink transmit (Tx) power control command for arbitrary UE groups. The DCI is differently used depending on its format, and it also has a different field that is defined within the DCI. Table 2 shows DCI according to a DCI format.

TABLE 2

| DCI format | Description |
|---|---|
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |

TABLE 2-continued

| DCI format | Description |
| --- | --- |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

Table 3 shows the DCI of Format 0, that is, uplink resource allocation information (or an uplink grant).

TABLE 3

-Carrier indicator-0 or 3 bits.-Flag for identifying format 0/format 1A-1 bit, where 0 indicates format 0 and 1 indicates format 1A.-Frequency hopping flag-1 bit, is a Most Significant Bit (MSB) corresponding to resource allocation at need and used to assign multiple clusters.- Resource block assignment and hopping resource allocation-$|\log_2(N_{RB}^{UL}(N_{RB}^{UL} + 1)/2)|$ bits - PUSCH hopping (corresponding to only single cluster allocation only):- $N_{UL\_HOP}$MSB bits are used to obtain the $\tilde{n}_{PRB}(i)$ value.- $(|\log_2(N_{RB}^{UL}(N_{RB}^{UL} + 1)/2)|$-$N_{UL\_hop})$ bits provide the resource allocation of
the first slot of an uplink subframe-In single cluster assignment, non-hopping PUSCH-$(|\log_2(N_{RB}^{UL}(N_{RB}^{UL} + 1)/2|)$ bits provide the resource allocation in the UL subframe.-Inmulti-cluster assignment, non-hopping PUSCH: Resource assignment is obtained from a combination of a frequency hopping flag field and a resource block assignment and hopping resource allocation field.-$\left[\log\left(\left(\frac{\lceil N_{RB}^{UL}/p + 1\rceil}{4}\right)\right)\right]$ resource allocation in an uplink subframe. wherein, P depends on the number of DL resource blocks.-Modulation and coding scheme and redundancy version-5 bits-New data indicator-1 bit-TPC command for scheduled PUSCH-2 bits-Cyclic shift for DM RS and OCC index-3 bits-UL index-2 bits, only exist for a TDD operation, that is, an uplink-downlink configuration 0.-Downlink Assignment Index (DAI)-2 bits only exist for TDD operations, that is, uplink-downlink configurations 1-6.-CQI request-1 or 2 bits. a 2 bit field applies to a UE configured using at least one DL cell.-SRS request-0 or 1 bit.-Multi-cluster flag-1 bit.

The flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

For example, in Table 3, if the resource allocation field has 13 bits in a band of an FDD 20 MHz, an uplink grant has a total of 27 bits (except a CIF field and a CRC field). If the length of bits determined as the input of blind decoding is 28 bits, a BS makes the uplink grant the total number of 28 bits by adding the redundant bits of 1 bit to the uplink grant at the time of scheduling. Here, all the redundant bits may be set to 0 because they do not include special information. Of course, the number of redundant bits may be smaller than or greater than 2.

The wireless communication system as 3GPP LTE of the present invention uses blind decoding for PDCCH/EPDCCH detection. The blind decoding is a scheme in which a desired identifier is de-masked from a CRC of a PDCCH/EPDCCH (referred to as a candidate PDCCH/EPDCCH) to determine whether the PDCCH/EPDCCH is its own channel by performing CRC error checking.

An eNB determines a PDCCH/EPDCCH format according to DCI to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH/EPDCCH.

Figure 7:
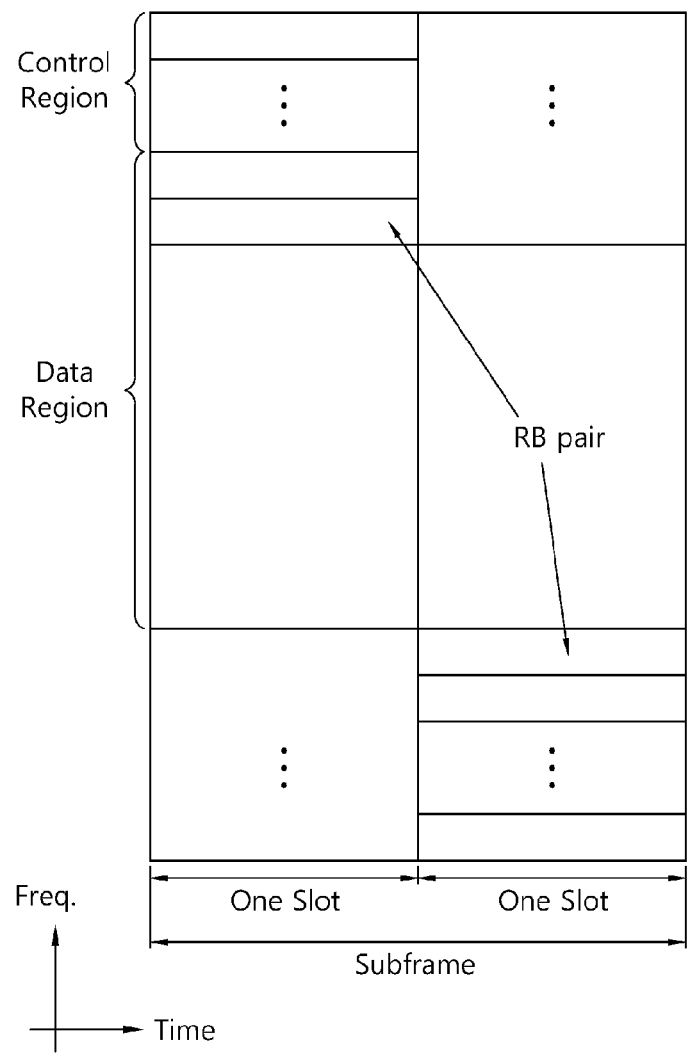
FIG. 7 shows the structure of an uplink subframe carrying an ACK/NACK signal to which the present invention is applied.

FIG. 7 is a view illustrating an example of a structure of an uplink subframe carrying an ACK/NACK signal to which the present invention is applied.

Referring to FIG. 7, an uplink subframe may be divided into a control region to which a physical uplink control channel (PUCCH) that carries uplink control information is allocated, herein; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair are resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Meanwhile, increasing the number of network nodes, and thereby bringing them physically closer to the user terminals is a key to improving traffic capacity and extending the achievable user-data rates of a wireless communication system.

Figure 8:
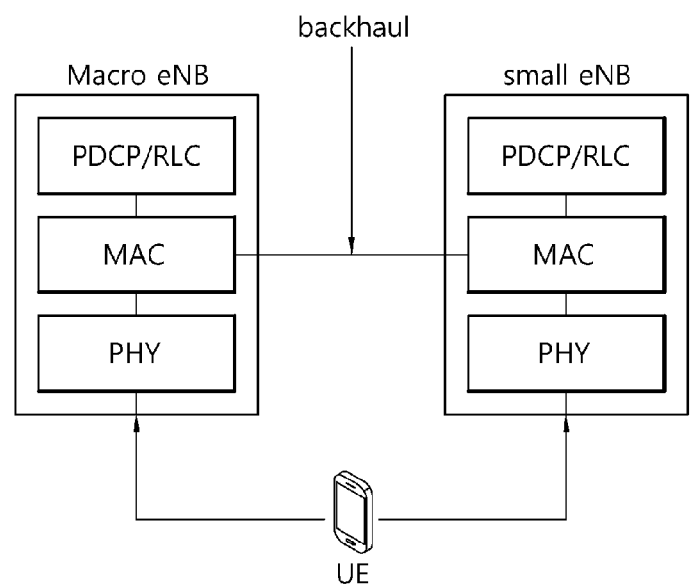
FIG. 8 shows an exemplary concept for dual connectivity according to an exemplary embodiment of the present invention.

FIG. 8 shows an exemplary concept for a heterogeneous network environment according to an exemplary embodiment of the present invention.

Referring to FIG. 8, the development of wireless communication technology, a heterogeneous network environment comes to the front. A macro cell, a femto cell, a pico cell, etc. are used in this heterogeneous network environment. As compared with a macro cell, a femto cell or a pico cell is a system that covers an area smaller than the existing mobile communication service radius. In addition to straightforward densification of a macro deployment, network densification can be achieved by the deployment of complementary low-power nodes under the coverage of an existing macro-node layer.

In such a heterogeneous deployment, the low-power nodes provide very high traffic capacity and very high user throughput locally, for example in indoor and outdoor hotspot positions. Meanwhile, the macro layer ensures service availability and QoE over the entire coverage area. In other words, the layer containing the low power nodes can also be referred to as providing local-area access, in contrast to the wide-area-covering macro layer. The installation of low-power nodes as well as heterogeneous deployments has been possible.

An extending the capabilities to operate in heterogeneous deployments are added to the LTE system, the macro and low-power layers, including different forms of macro assistance to the low-power layer and dual-layer connectivity. A dual connectivity implies that the device has simultaneous connections to both macro and low-power layers. Dual connectivity may imply Control and Data separation where, for instance, the control signaling for mobility is provided via the macro layer at the same time as high-speed data connectivity is provided via the low power layer as the small cell. A separation between downlink and uplink which is downlink and uplink connectivity is provided via different layers. Furthermore, the Dual connectivity may apply between different eNBs, where each eNB of the different eNBs provides via same layers (or as same type) on different site, herein, the different eNBs can be a case of small cells or a case of macro cells.

An UE of the present invention can support service via the macro cell having a frequency band of f1 to transmit and receive data transmission in Uplink/Downlink, and also the UE can support service via the small cell having a frequency band of f2 to transmit and receive data transmission in Uplink/Downlink, the f1 and f2 can be same or different or partially overlapped. That is, the UE can use the macro cell and the small cell simultaneously to supporting Dual connectivity, it is included that a radio link between the UE and the macro cell (macro eNB) and a radio link between the UE and the small cell (small eNB) is established respectively.

Therefore, the control for the radio link each can be needed. Herein the macro cell and the small cell, for instance, a radio interface protocol between the UE and each cell eNB can be classified into a first layer (L1), a second layer (L2), and a third layer (L3) based on three layers of the OSI in the communication system. For example, the macro eNB includes PDCP, RLC, MAC and PHY layer and the small eNB may include RLC, MAC and PHY layer, optionally PDCP layer is included. Herein the PDCP layer of the macro cell can be connected RLC layer of the small cell via the Xa (interface protocol), the Xa interface can be a X2 interface in LTE system. An EPS bearer each is established to provide service by establishing RB with the macro eNB and the small eNB each to UE.

Figure 9:
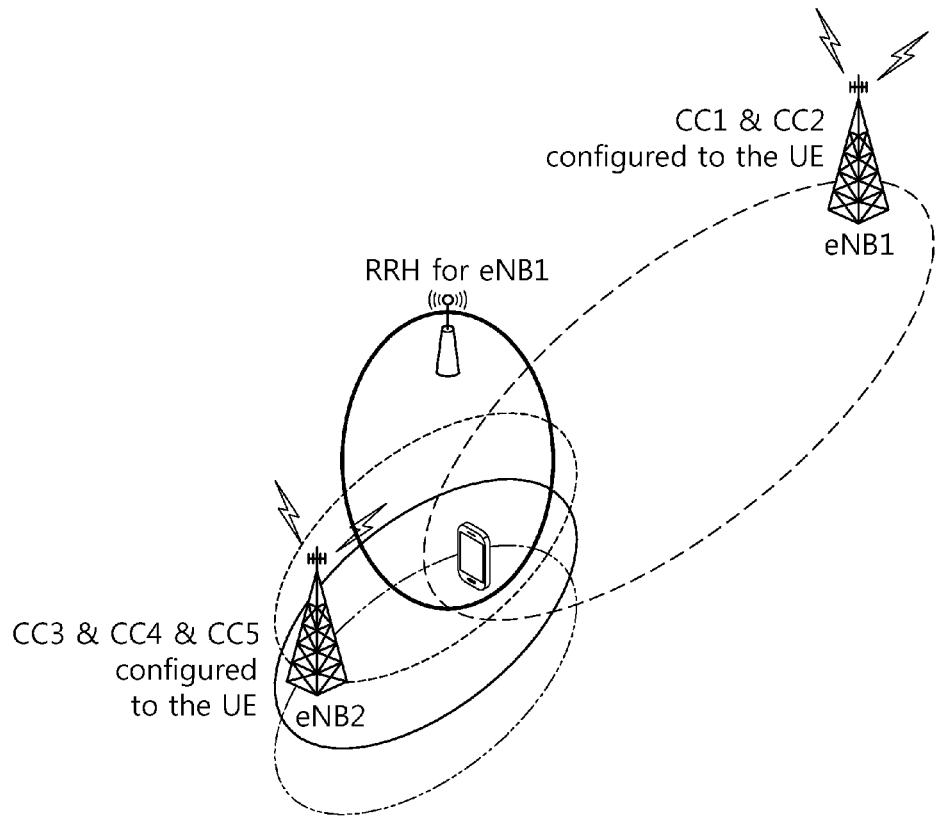
FIG. 9 shows an exemplary concept for configuring CAG according to an exemplary embodiment of the present invention.

FIG. 9 shows an exemplary concept for configuring CAG according to an exemplary embodiment of the present invention.

Referring to FIG. 9, with the great interest on small cell scenarios, it is likely that inter-site carrier aggregation in LTE may be supported as well. This invention provides a concept of Carrier Aggregation Group (CAG) where a group is defined as a group of cells belonging to the same eNB (i.e., sharing the MAC and upper layer).

Herein, the CAG can be determined based on duplex mode or any other category to allow different PCell where PUCCH can be transmitted. For example, FDD carriers are grouped as one CAG whereas TDD carriers are grouped as the other CAG. Also, there could be more than two CAGs configured each system where PCell exists per each CAG where PUCCH is transmitted.

Each UE in case of inter-site CA is configured, the UE can be configured with multiple CAG where each CAG may contain single CC or multiple CCs. An example of two CAG case (two inter-site CA) is shown in FIG. 9. In this example, eNB1 configures two CCs (CC1 and CC2) to the UE and eNB2 configures three CCs (CC3, CC4, CC5) to the UE. Within one eNB, CC can be different location via RRH or etc. Interface between eNBs via X2 or other means such as Xa is assumed to be slow backhaul so that data cannot be exchanged between eNBs in real time. It is can be further assumed that scheduling is done per each eNB independently.

For the first CAG (or CAG including the macro-cell carrier or CAG including PCell) is handling UE mobility in terms of hand-over and also handling RRC_IDLE UEs. In other words, UE may perform to hand-over to different PCell when PCell of the first CAG hand-over is required. Or, when a UE becomes in RRC_IDLE mode, PCell of the first CAG handles the UE.

Furthermore, paging in RRC_IDLE mode should be also supported by the first CAG. When a UE becomes RRC_IDLE mode, it shall assume all the carriers associated with non-first CAG (e.g., second or the other CAGs) would be deactivated. Moreover, other carriers except for PCell in the first CAG are assumed to be deactivated as well even without deactivation signals from higher layer. For a convenience, a PCell of the first CAG is called as a M-PCell which is a master of the PCell.

For each CAG, a cell can be designated as a PCell called CAG PCell which behaves as if PCell in Rel-10 LTE Carrier Aggregation. For example, A PCell is a CC in which the UE initially establishes a connection (or RRC connection) among several CCs. The PCell serves as a connection (or RRC connection) for signaling with respect to a plurality of CCs, and is a special CC for managing UE context which is connection information related to the UE. Further, when the PCell establishes the connection with the UE and thus is in an RRC connected mode, the PCell always exists in an activation state. And SCell is a CC assigned to the UE other than the PCell. The SCell is an extended carrier for additional resource assignment, etc., in addition to the PCell, and can be divided into an activation state and a deactivation state. The SCell is initially in the deactivation state.

From a UE perspective, if configured with multiple CAGs, it would have multiple PCells where each CAG is working independently from each other. Herein the Cells such as Serving cells of reconfiguration, adding, and removal processes of for the CAG can be performed by the RRC layer. When a SCell is newly added, RRC signaling can be used to transmit system information of a dedicated signaling.

In terms of handling radio link failure (RLF) at each CAG, it is assumed that RRC reconfiguration can be occurred when RLF occurs for the CAG which is not the first CAG. However, the RRC state of UE can be changed due to RLF at the first CAG only. In other words, a RLF on non-M-PCell(s) would not trigger transition of UE from RRC_CONNECTED to RRC_IDLE. The state transition may be occurred by RLF of the M-PCell. This implies that $T_{310}$ timer may be applicable only for the M-PCell whereas other new timer may be introduced to support the RLF of another PCell of the non-first CAG.

Hereinafter, CAG configuration is defined as below.

Each UE is assigned with one PCell which configures multiple CAGs if needed. In the example, CC1 can be PCell for the UE where other CCs will be configured by CC1 (PCell). Herein, if needed the multiple CAGs, the UE can apply a UE capability procedure for requiring the multiple CAGs. When a UE access a cell (initial access), it shall assume that the first connected cell is a M-PCell. When a network configures multiple CAGs, it will configure CAGs separate from the number of SCells. Thus, a mapping between CAG IDs and SCell index could be necessary.

Furthermore, a UE shall inform the capability whether it supports multiple CAGs or not to the network. This capability can be interpreted as whether it supports inter-site resource aggregation. Or, this capability can be assumed to be supported when a UE reports that it supports inter-site resource aggregation and simultaneous uplink transmissions (or simultaneous PUCCH/PUCCH transmissions).

Alternatively, a separate signaling to indicate the supportability on multiple CAGs can be considered. Even if a UE supports multiple CAGs, separate UE capability on simultaneous uplink transmissions (or simultaneous PUCCH/PUCCH transmissions) can be signaled per band and band-combination that the UE supports. If a UE supports multiple CAGs, it may assume that a UE can support multiple TAGs as well.

Furthermore, to support configuration of simultaneous PRACH transmissions to different CAGs, a UE or a network may inform whether two CAGs are synchronized or not.

The CAG has the following characteristics.

- There should be at least one CC per CAG which offers both DL and UL. Among CCs with DL and UL, one CC can be selected as CAG PCell for CAGs which do not contain PCell. As mentioned before, unless hand-over to different carrier, a carrier which the UE performs initial cell association should be assumed as a M-PCell. In other words, to change a M-PCell will be accomplished via a hand-over procedure.
- PUCCH is transmitted to CAG PCell uplink which contains HARQ-ACK for PDSCH transmitted via carriers in the same CAG or UCI for carriers in the same CAG only. Note that PUCCH can be transmitted via SCell uplink.
- However, in terms of UCI and HARQ-ACK content, PUCCH transmitted in one CAG will contains HARQ-ACK and UCI produced for carriers in the same CAG.
- UE shall monitor Common Search Space for CAG PCell downlink for each CAG in addition to that of PCell DL if CAG PCell DL is configured with CSS. A UE may be informed whether CAG PCell DL has CSS or not by a higher layer signaling or a UE may assume that it will carry CSS if CSS is detected or may assume that it will not carry CSS if CSS is not detected at the subframe where CSS (such as SIB) is scheduled.

In other words, if a UE is configured with not monitoring CSS of a CAG PCell (which is not first CAG), it may not monitor CSS even though CSS may be transmitted by PCell of the CAG. By default, unless configured otherwise, a UE assumes that it will monitor CSS of each CAG PCell. CSS can be scheduled by either PDCCH or EPDCCH.

Particularly, this is necessary to support random access response (RAR) and transmission power control (TPC) commands. Note that a separate RNTI (such as SI-RNTI, RA-RNTI, TPC-RNTI) can be configured per each PCell of CAG and each cell may carry multiple groups of CSS. In other words, a group-specific search space can be assumed for a non-M-PCell instead of cell-specific search space.

- UE is able to transmit PRACH to each CAG PCell without PDCCH Order (i.e., initial access RACH or content-based PRACH transmission is feasible). RACH configuration for each CAG PCell may be configured by PCell (via higher-layer signaling) or each CAG PCell has system information. UE can be configured to enable initial RACH transmission on each CAG PCell or not by PCell of a first CAG.
- For each CAG PCell, Carrier Indication Field will not be used. Within a CAG, each CAG PCell may assign CC index independently starting 0 (0 for CAG PCell) or only one list of CC index may be used for all CAGs configured to the UE. For example, in FIG. 1, CAG1 may assign 0 and 1 to CC1 and CC2 respectively and CAG2 assigns 0, 1 and 2 to CC3, CC4, and CC5 respectively if individual CC indexing is used per each CAG. Or, 0 to 4 is assigned to CC1 to CC5 if only one indexing is shared among CAGs. If individual CC indexing is used, CAG ID may be used for differentiate CCs in different CAGs. For example, CC3 can be identified as <CAG ID=2, CC index=0>.
- Any RRC configuration from a M-PCell, unless noted otherwise, can be applicable to all configured CCs.
- Any RRC configuration from a CAG PCell, unless noted otherwise, can be applicable to all configured CCs within the CAG.
- A M-PCell as well as CAG PCell are not deactivated unless CAG is configured to be removed. PCell and CAG PCell are maintained as activated CCs.
- Each PCell or CAG PCell performs activation/deactivation of CCs belonging to the same CAG respectively. If only one CC indexing is used, PCell may activate/deactivate CCs for other CAGs as well. UE is higher-layer configured with activation/deactivation mechanism if it is configurable.
- One or more TAG (Time Advance(Alignment) group). s can be configured per each CAG. However, TAG is not shared among multiple CAGs.
- Cross-carrier scheduling is allowed within a CAG, but not cross CAGs.
- RLF is performed for PCell and CAG PCells respectively and necessary hand-over procedure occurs when RLF is detected. Note that hand-over occurs only when a M-PCell RLF occurs. Hand-over due to RLF of CAG PCell is to 'reconfigure CAG' where previous CAG is removed and new CAG may be configured.
- A configuration for aperiodic CSI applies only to the one CAG where the configuration has occurred.
- HARQ-ACK works independently per each CAG.
- Uplink power control can be done per CAG basis where each eNB handles power control independently where a TPC (Transmit Power Control) command include power control for CCs belonging to the same CAG. When the UE power (summed for multiple CCs) exceeds a PCmax, Rel-11 rule may apply. That is, a UE can transmit power on one serving cell shall not exceed the configured maximum UE output power of the serving cell determined by this value. For PUCCHs among multiple CAGs collide and summed power exceeds PCmax, either power scaling is applied or PUCCH(s) in CAGs not containing a M-PCell may be dropped.

If dropping is applied, the CAGs with the highest CAG ID will be the first cut until the UE power becomes lower than PCmax.

Note that PCmax per each CAG may be predetermined such that the summation of PCmax of each CAG will not exceed the physical threshold of PCmax of the UE. For example, the ratio between power distributions among CAGs can be configured to a UE such that a UE computes its PCmax respectively according to the configured ratio.

Note that some of functions listed in the above may not be mandatory for CAG PCell. For example, CAG PCell may carry CSS or not.

Figure 10:
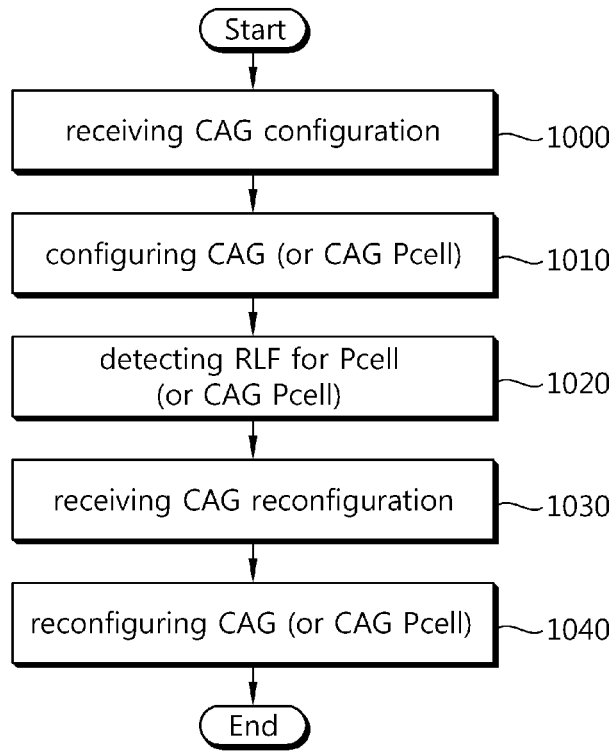
FIG. 10 shows an exemplary flow chart for configuring/reconfiguring CAG according to an exemplary embodiment of the present invention.

FIG. 10 shows an exemplary flow chart for configuring CAG according to an exemplary embodiment of the present invention.

Referring to FIG. 10, a UE receives a RRC configuration signal including at least one CC for a CAG1, herein the at least one CC for the CAG may be consisted of available frequency resources of an eNB1. The eNB1 includes a macro-cell which has at least two carriers (CC1 and CC2) for serving cells of CA. Furthermore, the UE receive a RRC configuration signal from eNB2 which configures three CCs (CC3, CC4, and CC5) for CA (1000), the eNB2 includes cells with different center frequencies having narrow RF coverage.

For example, a HetNet system including nodes or cells having various coverage can be applied in this invention. Network nodes forming the system may include a macro cell having a long coverage and a small cell having a short coverage which exists within the coverage of the macro cell. In the present invention, a small cell is used to generally refer to all cells or network nodes, such as a microcell, a pico cell, a hot spot, a femto cell, or different eNB which has a smaller coverage than the macro cell, and thus should be interpreted as a wider meaning than a common meaning. Furthermore, the small cell has narrower service coverage than a macro cell owing to limited transmit power. Here, restricted time resources or frequency resources are applied to cells, such as a small cell having lower priority in band allocation than the macro cell for handling the UE mobility. That is the CAG 1 is included in the macro cell and the CAG 2 is included in the small cell. Herein the each cell eNB can have a radio interface protocol between the UE like a FIG. 8.

In the step 1000, the UE can also receive a one RRC configuration signal including a SCell configuration including CC1 and CC2 for CAG 1 and SCell configuration including CC3, CC4, and CC5 for CAG 2 from the eNB1 as the macro-cell.

Herein, the eNB1 and eNB2 may permit the UE to use a plurality of CCs according to the hardware performance of the UE and available frequency resources of the eNB and may define a plurality of the CAG. When needed the multiple CAGs, the UE can apply a UE capability procedure for requiring the multiple CAGs and receive an enabling of the multiple CAGs from the eNB of the macro-cell. Or the UE can receive enabling information of a corresponding CAG with CAG-id from the corresponding eNB on the macro cell and the small cell each.

Herein the RRC configuration signal includes that SCell release/SCell addition/modification with the CAG each. The RRC configuration can be transmitted in MAC main configuration in a RRC signal.

The UE configures CAG and a cell can be designated as a PCell called in each CAG (1010). That is, the UE configure CAG and a cell can be designated as a PCell called in each CAG in accordance with the received the MAC main configuration in a RRC signal.

If the received mac-MainConfig by reception of the RRCConnectionReconfiguration by the UE includes the CAG-ToReleaseList, for each CAG-Id value included in the CAG-ToReleaseList that is part of the current UE configuration, the UE releases the CAG indicated by CAG-Id.

If the received mac-MainConfig includes the CAG-ToAddModList, for each CAG-Id value included in CAG-ToAddModList that is not part of the current UE configuration (CAG addition), the UE adds the CAG, corresponding to the CAG-Id, herein the for each CAG-Id value included in CAG-ToAddModList that is part of the current UE configuration (CAG modification), that is the UE reconfigure the CAG, corresponding to the CAG-Id.

Hereinafter, SCell release in a CAG can be applied to Sell release procedure. If the release is triggered by reception of the sCellToReleaseList in a CAG, for each sCellIndex value included in the sCellToReleaseList, if the current UE configuration includes an SCell with value sCellIndex, the UE releases the SCell in the CAG. When the release is triggered by RRC connection re-establishment, the UE releases all SCells that are part of the current UE configuration of the CAG.

Whereas, a SCell addition/modification in a CAG can be applied to SCell addition/modification procedure, the UE can modify the SCell configuration for each sCellIndex value included in the sCellToAddModList that is not part of the current UE configuration (SCell addition), that is, the UE adds the SCell corresponding to the cellIdentification, in accordance with the received a signal of a radioResourceConfigCommonSCell or a signal of a radioResourceConfigDedicatedSCell. And the UE configures lower layers to consider the SCell to be in deactivated state.

Also, when each sCellIndex value included in the sCellToAddModList that is part of the current UE configuration (SCell modification), the UE can modify the SCell configuration in accordance with the received a signal of radioResourceConfigDedicatedSCell.

After the UE may be indicated activation/deactivation of a CC in each CAG by including or excluding the CC from MAC control. The UE can perform RACH procedure to CAG PCell without PDCCH Order since the PCell always exists in an activation state.

When the UE detects that RLF is detected for PCell and CAG PCells respectively (1020), a UE procedure of hand-over is occurred only when PCell RLF occurs. And the UE can receive hand-over procedure message or reconfiguration message by RRC signal from the eNB1 (1030).

The UE receives and determine a RRC configuration signal including at least one CC for a CAG1 and CAG2 is reconfigured. For example, the reconfiguration is occurred if the UE detects that RLF is detected for PCell.

Herein the RRC configuration includes that RadioResourceConfigDedicated is used to setup/modify/release RBs, to modify the MAC main configuration, to modify the SPS configuration and to modify dedicated physical configuration. That is The UE modify the SCell configuration in accordance with the received radioResourceConfigDedicatedSCell. Then, the UE reconfigures CAG and reconfigures corresponding one or more Scell to each CAG1 or CAG2 (1040).

As described, this invention provides that the at least two serving cells with different coverage for Carrier Aggregation Group (CAG) of eNB each can be used for data transmission. More details, this invention can be included that multiple CAG where each CAG containing single CC or multiple CCs with different carriers, for example, a CAG including cells of a macro-eNB and a CAG including cells of a small eNB are configured for UE. Therefore, this invention may keep the benefit of macro coverage in terms of hand-over & coverage, boost data throughput by localizing data transmission, and offload heavy load from the macro-cell. So it can offer better Quality of Experience (QoE) on UEs in particular cell-edge UEs. Also a more efficient cell planning for multi-CCs is provided in this invention.

Figure 11:
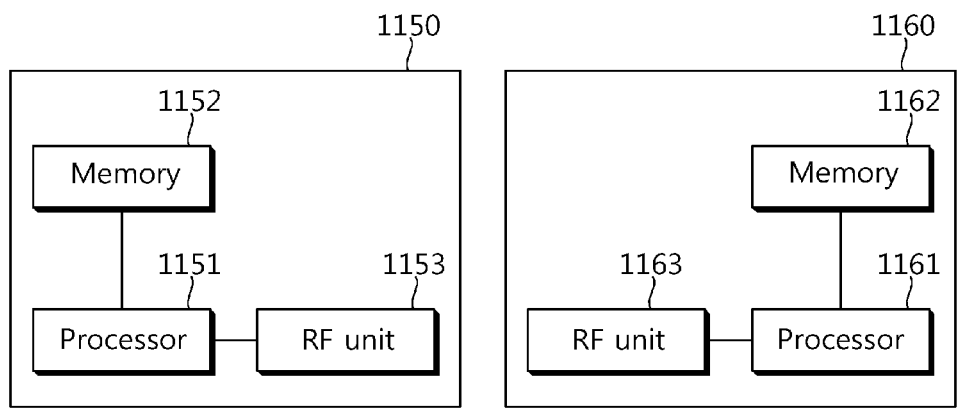
FIG. 11 shows a block diagram showing a wireless communication system according to an exemplary embodiment of the present invention.

FIG. 11 is a block diagram showing a wireless communication system according to an embodiment of the present invention.

A BS 1150 includes a processor 1151, a memory 1152, and a radio frequency (RF) unit 1153. The memory 1152 is coupled to the processor 1151, and stores a variety of information for driving the processor 1151. The RF unit 1153 is coupled to the processor 1151, and transmits and/or receives a radio signal. The processor 1151 implements the proposed functions, procedures, and/or methods. In the embodiments of FIG. 2 to FIG. 10, the operation of the BS can be implemented by the processor 1151.

Especially, the processor 1151 may configure multiple CAGs where each CAG containing single CC or multiple CCs with different carriers and measurement objects for inter-frequency measurement and RLF for multiple CAGs. The processor 1151 determines CAG1 of a macro cell may assign 0 and 1 to CC1 and CC2 respectively and CAG2 assigns 0, 1 and 2 to CC3, CC4, and CC5 respectively if individual CC indexing is used per each CAG. Herein individual CC indexing is used, CAG ID may be used for differentiate CCs in different CAGs. For example, the processor 1151 configure a RRC configuration signal including a mac-MainConfig includes for each CAG-Id value included in the CAG List that is part of the current UE configuration, the UE configures the multiple CAGs indicated by CAG-Id, herein the each CAG containing single CC or multiple CCs with different carriers.

The processor 1151 may control resources of Uplink of the UE that PUCCH is transmitted to CAG PCell uplink only for each CAG in addition to PCell uplink and RACH is transmitted to CAG PCell without PDCCH Order, there is one or more TAGs can be configured per each CAG. And then the processor 1151 may control power that a scaling parameter as an offset or a predetermined rule is configured for PUCCH(s) in CAGs each. The processor 1151 may configure to UE small cell discovery parameters such as a center frequency, a measurement period, and a threshold or selection criteria of RRM measurement, etc. This invention assumes that macro-cell is aggregated as PCell of CAG and a small cell is aggregated as a SCell. Between the macro-cell and the small cell may connect via X2 interface or a new backhaul interface so that the processor 1151 may be included in the macro-cell and/or the small cell.

Whereas, an wireless device 1160 includes a processor 1161, a memory 1162, and an RF unit 1163. The memory 1162 is coupled to the processor 1161, and stores a variety of information for driving the processor 1161. The RF unit 1163 is coupled to the processor 1161, and transmits and/or receives a radio signal. The processor 1161 implements the proposed functions, procedures, and/or methods. In the embodiments of the FIG. 2 to FIG. 10, the operation of the UE can be implemented by the processor 1161.

Especially, the processor 1161 may receive a RRC configuration signal, configure multiple CAGs where each CAG containing single CC or multiple CCs with different carriers, measures measurement objects for inter-frequency measurement, and detects RLF for multiple CAGs. The processor 1161 determines CAG1 of a macro cell may assign 0 and 1 to CC1 and CC2 respectively and CAG2 assigns 0, 1 and 2 to CC3, CC4, and CC5 respectively if individual CC indexing is used per each CAG. Herein individual CC indexing is used, CAG ID may be used for differentiate CCs in different CAGs. For example, the processor 1161 receives and determines a RRC configuration signal including a mac-MainConfig includes for each CAG-Id value included in the CAG List that is part of the current UE configuration, the UE configures the multiple CAGs indicated by CAG-Id, herein the each CAG containing single CC or multiple CCs with different carriers.

The processor 1161 may control resources of Uplink of the UE that PUCCH is transmitted to CAG PCell uplink only for each CAG in addition to PCell uplink and RACH is transmitted to CAG PCell without PDCCH Order, there is one or more TAGs can be configured per each CAG. And then the processor 1161 may control power when PUCCHs among multiple CAGs collide and summed power exceeds PCmax, either power scaling is applied or PUCCH(s) in CAGs not containing PCell may be dropped. The processor 1161 may configure to UE small cell discovery parameters such as a center frequency, a measurement period, and a threshold or selection criteria of RRM measurement, etc.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for supporting a carrier aggregation group in a wireless communication system supporting multiple carriers, the method performed by a wireless device and comprising:

receiving a radio resource control (RRC) configuration message including a first parameter related to one or more serving cells from a macro cell and a second parameter related to one or more serving cells from a small cell; and configuring two or more carrier aggregation groups (CAGs) based on the first parameter and the second parameter, wherein a medium access control (MAC) main configuration is configured independently per each CAG of the two or more CAGs, wherein the MAC main configuration includes a CAG identification (ID) for the configuration of two or more CAGs, wherein a release, an addition or a modification of a secondary cell (SCell) in a first CAG of the two or more CAGs is applied in accordance with a first parameter related to a common SCell radio resource configuration and a second parameter related to a dedicated SCell radio resource configuration, wherein the first CAG of the two or more CAGs is a group of one or more serving cells employing carrier aggregation, wherein the RRC configuration message is used to modify an RRC connection between the wireless device and a eNodeB (eNB), and wherein a primary serving cell (PCell) for each CAG of the two or more CAGs is configured independently from each other.

2. The method of claim 1, wherein a PCell of the macro cell is aggregated as a master PCell (M-PCell), which is a PCell for the first CAG of the two or more CAGs, and wherein an eNB for the macro cell and an eNB for the small cell are connected via an X2 interface or an Xa interface.

3. The method of claim 2, further comprising:
configuring the M-PCell to handle a user equipment (UE) mobility of the wireless device.

4. The method of claim 1, further comprising:
transmitting a physical uplink control channel (PUCCH) to one CAG PCell for component carriers belonging to a same CAG.

5. The method of claim 1, further comprising:
monitoring Common Search Space (CSS) of the PCell for the each CAG of the one or more CAGs.

6. The method of claim 1, further comprising:
configuring a random access channel (RACH) configuration for the each CAG of the one or more CAGs; and transmitting a Physical RACH (PRACH) to the PCell for the two or more CAGs without a physical downlink control channel (PDCCH) order or a PRACH resource signaled by a higher-layer.

7. The method of claim 1, further comprising:
detecting a Radio Link Failure (RLF) for the PCell for the each CAG of the two or more CAGs;

configuring a handover procedure for a master primary serving cell (M-P Cell); and reconfiguring the each CAG of the two or more CAGs for the RLF.

8. The method of claim 1, further comprising:
configuring one or more Time Advance groups (TAGs) per the each CAG of the two or more CAGs.

9. A wireless device for supporting a carrier aggregation group in a wireless communication system supporting multiple carriers, the wireless device comprising:

a radio frequency unit configured to receive a radio signal; and a processor, operatively coupled with the radio frequency unit, wherein the processor is configured to:
receive a radio resource control (RRC) configuration message including a first parameter related to one or more serving cells from a macro cell and a second parameter related to one or more serving cells from a small cell, and configure two or more carrier aggregation groups (CAGs) based on the first parameter and the second parameter, wherein a medium access control (MAC) main configuration is configured independently per each CAG of the two or more CAGs, wherein the MAC main configuration includes a CAG identification (ID) for the configuration of the two or more CAGs, wherein a release, an addition or a modification of a secondary cell (SCell) in a first CAG of the two or more CAGs is applied in accordance with a first parameter related to a common SCell radio resource configuration and a second parameter related to a dedicated SCell radio resource configuration, wherein the first CAG of the two or more CAGs is a group of one or more serving cells employing carrier aggregation, wherein the RRC configuration message is used to modify an RRC connection between the wireless device and a eNodeB (eNB), and wherein a primary serving cell (PCell) for each CAG of the two or more CAGs is configured independently from each other.

* * * * *